US006898853B2

(12) United States Patent
Tsubouchi et al.

(10) Patent No.: US 6,898,853 B2
(45) Date of Patent: May 31, 2005

(54) METHOD FOR MANUFACTURING A HOLLOW RACK SHAFT

(75) Inventors: Akira Tsubouchi, Maebahshi (JP); Kiyoshi Okubo, Maebahshi (JP); Yasushi Watanabe, Maebahshi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/315,297

(22) Filed: Dec. 9, 2002

(65) Prior Publication Data

US 2003/0079516 A1 May 1, 2003

Related U.S. Application Data

(62) Division of application No. 09/803,560, filed on Mar. 9, 2001.

(30) Foreign Application Priority Data

| Mar. 9, 2000 | (JP) | ................................ 2000-064298 |
| Apr. 14, 2000 | (JP) | ................................ 2000-114306 |
| Apr. 17, 2000 | (JP) | ................................ 2000-114502 |

(51) Int. Cl.$^7$ ............................. B21D 53/28; B21K 1/30; B21C 25/02
(52) U.S. Cl. ................ 29/893.34; 29/893.3; 29/893.35; 72/370.04; 72/370.21; 74/422; 74/457
(58) Field of Search ............................. 72/413, 416, 478, 72/370.04, 370.21, 398, 400, 401, 414; 29/893.3, 893.32, 893.34, 893.36; 74/89.11, 422, 457

(56) References Cited

U.S. PATENT DOCUMENTS

| 2,419,724 | A | | 4/1947 | Millard et al. ................ 153/21 |
| 2,804,681 | A | * | 9/1957 | Brueckner .................. 29/893.3 |
| 3,102,576 | A | | 9/1963 | Shilberg ...................... 153/86 |
| 3,711,915 | A | * | 1/1973 | Maxon et al. .............. 29/893.3 |
| 3,731,516 | A | * | 5/1973 | Dohmann et al. ......... 72/355.6 |
| 4,133,221 | A | * | 1/1979 | Clary ............................ 74/498 |
| 4,424,727 | A | | 1/1984 | Mader ....................... 76/107 R |
| 4,546,639 | A | * | 10/1985 | Corrette ....................... 72/469 |
| 4,571,982 | A | * | 2/1986 | Bishop et al. ................ 72/400 |
| 4,598,451 | A | * | 7/1986 | Ohki .......................... 29/893.3 |
| 4,641,406 | A | * | 2/1987 | Rogers ...................... 29/893.3 |
| 4,646,554 | A | * | 3/1987 | Wallis et al. ................. 72/406 |
| 5,007,264 | A | | 4/1991 | Haack ............................ 71/10 |
| 5,992,205 | A | * | 11/1999 | Bishop ........................ 72/360 |
| 6,289,710 | B1 | * | 9/2001 | Ozeki ...................... 72/370.04 |

(Continued)

FOREIGN PATENT DOCUMENTS

| GB | 2026908 A | * | 2/1980 | ........... B21D/53/88 |
| GB | 2056894 A | * | 3/1981 | ........... B21D/53/88 |
| GB | 2061138 A | * | 5/1981 | ........... B21D/53/88 |
| GB | 2108026 A | * | 5/1983 | ............. B21J/5/02 |
| JP | 58-218339 A | | 12/1983 | |
| JP | 05-345231 A | | 12/1993 | |
| JP | 06-246379 A | | 9/1994 | |
| JP | 11-180318 A | | 7/1999 | |
| JP | 11-278287 A | | 10/1999 | |

Primary Examiner—Essama Omgba
(74) Attorney, Agent, or Firm—Sidley Austin Brown & Wood LLP

(57) ABSTRACT

A hollow rack shaft is manufactured through a first step, a second step and a third step. At the first step, the plate-like workpiece of substantial rectangular shape is press-formed into a gutter-like shape. At the second step, a row of rack teeth is press-formed by a preliminary forming step and a main forming step on the flat bottom portion of the workpiece formed in the first step. The die set used at the second step is provided with a recess for releasing surplus workpiece material within the die clearance at a stroke end of the pressworking and each die set is divided into a plurality of segments at the recess. At the third step, each of a pair of legs of the workpiece is bent in a semi-circular shape so as to be butted to each other.

1 Claim, 14 Drawing Sheets

U.S. PATENT DOCUMENTS

| | | | |
|---|---|---|---|
| 6,317,979 B1 * | 11/2001 | Yamawaki | 29/893.34 |
| 6,442,992 B2 * | 9/2002 | Tsubouchi et al. | 72/370.21 |
| 6,502,473 B1 * | 1/2003 | Akiyama et al. | 74/89.17 |
| 6,575,009 B2 * | 6/2003 | Shiokawa | 72/370.06 |
| 6,588,293 B2 * | 7/2003 | Tsubouchi et al. | 74/422 |
| 6,718,813 B2 | 4/2004 | Yasuda et al. | 72/370.04 |
| 6,779,271 B2 * | 8/2004 | Tsubouchi et al. | 29/893.34 |
| 2001/0020328 A1 * | 9/2001 | Tsubouchi et al. | 29/893.34 |
| 2002/0020237 A1 * | 2/2002 | Tsubouchi et al. | 74/422 |
| 2002/0073793 A1 * | 6/2002 | Tsubouchi et al. | 74/422 |
| 2003/0097894 A1 * | 5/2003 | Ozeki | 74/422 |
| 2003/0209100 A1 * | 11/2003 | Tsubouchi et al. | 74/422 |
| 2003/0213321 A1 * | 11/2003 | Tsubouchi et al. | 74/422 |

* cited by examiner

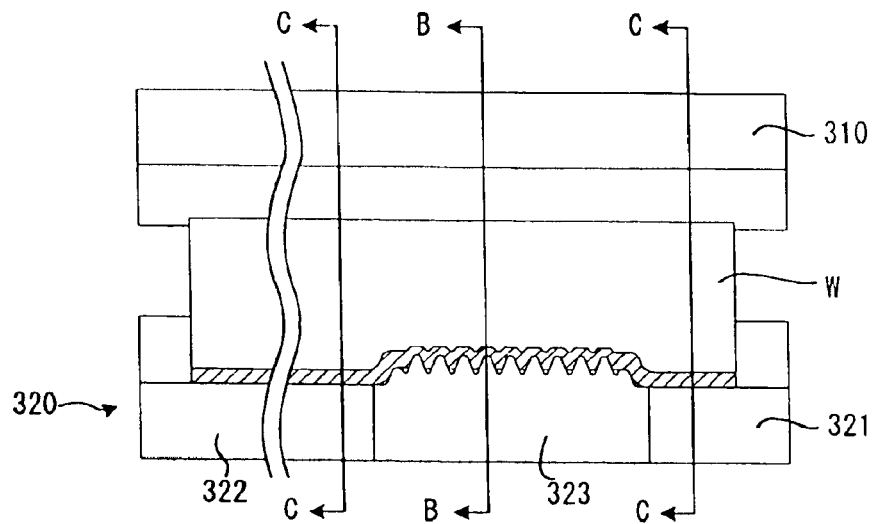
Fig.7a PRIOR ART
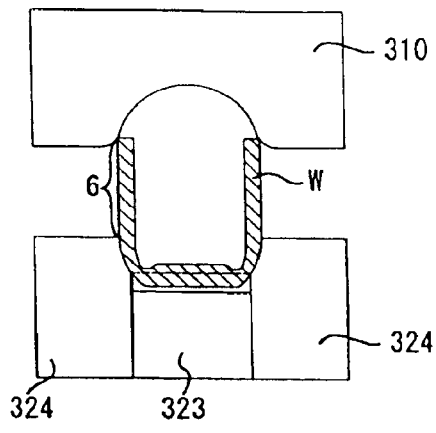 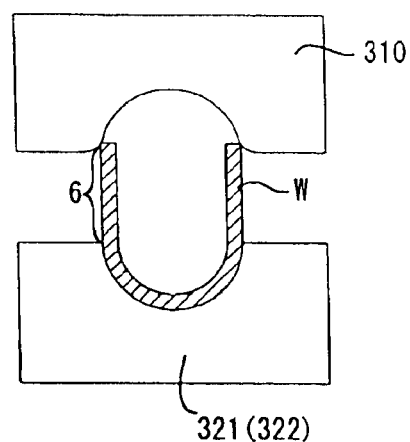
Fig.7b PRIOR ART    Fig.7c PRIOR ART

METHOD FOR MANUFACTURING A HOLLOW RACK SHAFT

This application is a divisional of co-pending application Ser. No. 09/803,560, filed Mar. 9, 2001, the contents of which are hereby incorporated by reference.

BACKGROUND OF THE INVENTION

1. Field of the Invention

This invention relates to a hollow rack shaft, and more particularly to a method for manufacturing a hollow rack shaft for a steering system used in an automobile.

2. Description of the Related Art

In the case of a rack-and-pinion type steering system for an automobile frequently used in an automobile industry, the rotation of a steering wheel operated by a driver is transmitted to a pinion. The rotation of this pinion is transmitted to a rack shaft engaged with the pinion and this is converted into a motion in a lateral direction (a longitudinal direction of the rack). Since the rack shaft is connected to the steering rod, the direction of front wheels is changed by a lateral motion of the rack shaft. Since such a steering mechanism as described above is well known in the art, further description will be eliminated.

The aforesaid rack shaft has been attained by gear cutting on a solid, namely not hollow, material. In recent years, as already described in Japanese Laid-Open Patent No. Hei 6-246379, Japanese Laid-Open Patent No. Sho 58-218339 (Japanese Patent Publication No. Hei 4-028582) and Japanese Laid-Open Patent No. Hei 11-180318, fuel efficiency of an automobile has been improved by making a hollow rack shaft to attain the lightweightization of the rack shaft.

A manufacturing method for forming rack is disclosed in Japanese Laid-Open Patent No. Hei 6-246379, which describes that a tube material is inserted into a first forming split die, a primary forming is carried out, then, the aforesaid primary formed material is inserted into a secondary forming split die having, at a part of its inner surface, teeth corresponding to the rack teeth, a semi-circular mandrel is press fitted at one end of it.

A manufacturing method disclosed in Japanese Laid-Open Patent No. Sho 58-218339 describes that a die having teeth corresponding to the rack teeth is pushed to a tube material to form rack teeth under the state that a mandrel is inserted into the tube material surrounded with fixed die.

The manufacturing method disclosed in Japanese Laid-Open Patent No. Hei 11-180318 is an invention invented by Mr. Ohkubo, one of the inventors of the present invention. The manufacturing method comprises the following first to third steps. At the first step, a plate-like material having a substantial rectangular shape as original one is bent into a gutter shape along a center of longitudinal direction. At this time, the central part of the gutter-shaped member is formed into a flat bottom section, and both the side portions are formed into a semi-circular shape having legs therein. At the second step, the rack teeth are plastically formed at the flat bottom portion. At the third step, the gutter-shaped material is bent such that the legs of the central part and the both sides are abutted to each other, and then a hollow rack shaft is formed.

In the case disclosed in the first two gazettes above, the hollow original workpiece is applied as the material, while, in the case disclosed in the third gazette (the gazette of Japanese Laid-Open Patent No. Hei 11-180318), a flat plate workpiece is applied in place of the hollow workpiece, so that the third manufacturing method has some merits in view of material cost, transportation cost and storing cost. Further, according to the third manufacturing method, it is avoidable to give each portion except a tooth bottom portion an excessive thickness in order to maintain the tooth bottom portion at a required wall thickness. Then, the rack shaft can be sufficiently light in its weight.

SUMMARY OF THE INVENTION

However, it has become apparent that the manufacturing method disclosed in the gazette of Japanese Laid-Open Patent No. Hei 11-180318 has some problems not considered up to now as described below.

Although, in general, almost the deformation applied to the work piece by a plastic working operation gives a permanent deformation, temporary deformation, i.e. elastic deformation remains in a part of deformation. As the lead applied by the die is removed, the elastic deformation remaining at each minute element in the workpiece is restored and it is transferred to a new balanced state where each of the forces of the other fine elements keeps its balance. Due to this fact, after the workpiece is removed from the die, the entire workpiece does not take a shape coinciding with the die and its shape deviates from that of the die. In particular, in the case that a degree of forming is widely different in reference to each of the locations at the workpiece, this deviation shows a large value.

FIGS. 1a to 1c show the state when the flat plate workpiece is formed into a gutter-like shape at the first step of the prior art manufacturing method (the final stage of press stroke). In this case, FIG. 1a is a front sectional view for showing a workpiece and a die. FIG. 1b is a sectional view taken along line B—B of FIG. 1a. FIG. 1c is a sectional view taken along line C—C of FIG. 1a. The die set at the first step comprises an upper die set 110 including a right upper die 111, a left upper die 112 and a central upper die 113; and a lower die set 120 including a right lower die 121, a left lower die 122 and a central lower die 123. As apparent from these figures, a workpiece W is formed by the lower die set 120 and the upper die set 110 into a gutter-like shape having a flat bottomed central portion 2a, a rack tooth not-yet formed, and having semi-circular bottomed portions 1 extending from the both sides of the flat bottomed central portion 2a.

Upon completion of the first step, when the upper die set 110 is lifted up to take out the workpiece W, the workpiece W takes a different shape from that of the lower die set 120 and the upper die set 110. FIG. 2 is a sectional view for showing the workpiece W expressed under the state of releasing such a stress as above being exaggerated, as shown in this figure, the workpiece W is warped like a bow with the bottom part of the gutter being placed inside, i.e. the opening of the legs being placed outside.

The reason why such a state occurs is as follows. The original plate workpiece is formed into different shape at each potion, therefore, the degree of deformation given to each portion differs from others. Namely, the degree of deformation given to the flat bottom portion 2a, the semi-circular bottom portion 1 and the interface portion 9 of the workpiece are different from each other. When the load applied to the workpiece is unloaded after plastic working, each portion recovers elastically in correspondingly different manner. Hence the workpiece warps like a bow.

Further, a similar problem may also occur at the second step of the prior art manufacturing method. FIG. 3 is a sectional view for showing the workpiece W and the dies when rack teeth 2b are formed at the portion 2a (FIG. 2) at the second step. The die set at the second step comprises an upper die set 210 including a right upper die 211, a left upper die 212 and a central upper die 213; and a lower die set 220 including a right lower die 221, a left lower die 222 and a central lower die 223. The upper surface of the central lower die 223 is formed with teeth complementary shape to the rack teeth to be formed. In addition, the lower surface of the central upper die 213 is provided with a corrugated shape corresponding to the rack teeth at the surface.

The rack teeth unformed portion 2a of the workpiece W is formed with rack teeth by approaching the central lower die 223 and the central upper die 213 to each other under the state that the semi-circular part 1 of the workpiece W is held between the right upper die 211, the right lower die 221 and between the left upper die 212 and the left lower die 222.

Since many teeth are formed at the rack portion 2b the degree of forming at each location is different. When the workpiece W is removed from the die upon completion of the second step, the workpiece W sometimes shows unintended deformation by the same cause as above. FIG. 4 illustrates one example of the workpiece W in which deformation appeared, in this case, the workpiece W is warped like a bow shape with the bottom part of the gutter being set inside i.e. with the opening part of the leg being set outside.

Even if the third step for butting legs is applied to the workpiece W which has unintended deformation after the second step, this deformation remains, so that as shown in FIG. 5 at its exaggerated form, the workpiece W having unintended deformation, for example, a bow-shaped warp is attained. The workpiece having such a warp as above cannot be used as a rack shaft as it is.

At the second step of the prior art manufacturing method, another problem differing from the aforesaid problem may occur. FIGS. 6a and 6b are a front sectional view and a sectional view taken along line B-B to illustrate this problem. It should be noted that these figures are illustrated in inverse relation in a vertical orientation against the aforesaid figures. In addition, side clamping dies 203 are auxiliary dies for clamping the workpiece W from side surfaces to prevent the workpiece W from being moved.

As already described above, rack teeth are formed by the central upper die 213 and the central lower die 223. These dies are designed such that the volume of the clearance composed of two dies is slightly larger than the volume of the workpiece W placed in the clearance when the central upper die 213 and the central lower die 223 approach most during forming of rack teeth.

However, in the case that the workpiece W is thicker than the intended thickness or, in the case that a volume of the aforesaid minimum clearance is smaller than the intended volume due to an error in stroke of a press machine, the pressure at this clearance becomes quite high. Due to this fact, a quite high load is applied to the central upper die 213 and the central lower die 223, and in particular, the load is concentrated at either the cavity 5a or 5b. These excessive load or fatigue of die material caused by repeated application of the load may generate a crack 5 (or damage) in dies 213, 223 as shown in FIG. 6a.

In addition, when the rack teeth are formed, a quite large amount of material must be flown near the teeth ends of the workpiece W, in particular, a crack 5 may easily be generated at either the cavity 5a or 5b.

Further, at the third step of the prior art manufacturing method, another problem differing from the aforesaid problem is generated. FIGS. 7a to 7c, FIGS. 8a to 8c and FIGS. 9a to 9c are views for illustrating processes in which the hollow rack shaft is formed by bending both legs of the workpiece W so as to be butted to each other. FIG. 7a, FIG. 8a and FIG. 9a are front sectional views. FIG. 7b, FIG. 8b and FIG. 9b are sectional views taken along line B—B in the front sectional views. FIG. 7c, FIG. 8c and FIG. 9c are sectional views taken along line C—C in each of the front sectional views, respectively.

At first, as shown in FIGS. 7a to 7c, the workpiece W formed with rack teeth at the second step is supported on the lower die set 320 including the left lower die 322, the central lower die 323 and the right lower die 321. In addition, a pair of side lower dies 324 are arranged at the both sides of the central lower die 323 and they support the side lower portion of the workpiece W. The upper surfaces of these dies have such a shape that the workpiece W passed through the second step is well fitted. In addition, the upper die 310 has, at its lower part, a semi-circular concave surface having a diameter that is approximately the same as a clearance at the legs of the workpiece W.

Then, when the upper die 310 descends, both legs 6 of the workpiece W are guided by the semi-circular concave surface and start to deform under application of bending force directed inwardly. At this time, although a high bending moment is applied near the roots of the legs 6, only a low bending moment is applied to the location near the extremity ends of the legs 6. Due to this fact, as shown in FIGS. 8b and 8c, deformation progresses only at the location near the roots of the legs 6 and the portions near the extremity ends of the legs 6 are scarcely deformed.

Due to this fact, as shown in FIGS. 9a to 9c, even if the upper die 310 descends down to the stroke end, a linear portion 7 undeformed into an arc shape remains near the extremity ends of the legs 6. As a result, since the sectional shape is not a true circle, the finished rack shaft becomes an inferior product. Further, since the butted end surfaces are not properly faced to each other, the end surfaces are inclined to form a V-shaped groove, so that they may become hindrance when a welding such as a laser welding and the like is performed.

It is required that a cylindrical shape without strain is formed by smoothly connecting the semi-circular bottom portion formed at the first step and the back arc portion formed at the third step, so that such a rack shaft as above is repaired by cutting or grinding operation or it is wasted as an improper product.

If it is assumed that the rack shaft having a deformed cylindrical part and the deformed semi-circular portion of the rack is attained, the grinding margin at the subsequent grinding step must have a large amount in order to correct this deformed sectional shape into a right circular shape. This process may become a problem that not only increasing manufacturing cost but also decreasing strength of the rack shaft as grinding margin increases, as a result, the rack shaft is damaged or its lifetime is shortened. If the thickness of the original plate member is made thicker in compliance with the grinding margin to prevent a reduction in strength, other portion of the completed hollow rack shaft becomes thicker than required, so that this may become a problem that the product may not satisfy the required weight reduction.

This invention aims at resolving these problems, and in this invention, a hollow rack shaft is manufactured through the first step, second step and third step, respectively. At the first step, a substantially rectangular plate workpiece is formed into a gutter-like shaped workpiece by press-forming. The gutter-like shaped workpiece has a bottom portion and a pair of leg-like side walls extending from the side edges of the bottom portion and substantially in parallel from each other. The bottom portion comprises a substantial flat bottom portion at a central portion in a longitudinal direction and semi-circular bottom portions at both outer sides. At the second step, a row of rack teeth is press-formed at the aforesaid flat bottom portion of the workpiece. At the third step, each of the pair of leg-like sidewalls of the workpiece formed at the second step is bent into a semi-circular shape to be butted to each other.

At the first step of this invention, further the first die set is used, wherein the first die set is provided with a surface such as complementary shape to each of the two semi-circular bottom portions in the gutter-like shape, and the surface such as the complementary shape is inclined to eliminate elastic deformation generated at the workpiece when the workpiece is removed from the first die set.

At the one second step in this invention, the second die set is used, the second die set is provided with a die surface such as complementary shape to a row of rack teeth formed at the flat bottom portion, the surface such as the complementary shape also has a shape for canceling elastic deformation of this workpiece when the workpiece is removed from the second die set.

At another second step of this invention, the second die set is used, the second die set is provided with a die surface such as complementary shape to a row of rack teeth formed at the flat bottom portion, a part of the die surface such as complementary shape is provided with recess for releasing the surplus material of the workpiece in the die clearance at the stroke end of the press-forming. The second die set can be divided into a plurality of segments at the location of recess. The recess is located at a position where a protrusion formed by the recess does not interfere with a pinion engaged with the rack.

The other second step of this invention comprises a preliminary forming step and a main forming step, wherein at the preliminary forming step, a row of teeth, having substantially the same pitch as the pitch of a row of rack teeth finally formed and having a smaller pressure angle than a pressure angle of the rack teeth finally formed, is formed. And at the main forming step, a row of teeth formed at the preliminary forming step is reformed into a row of rack teeth having required rack teeth shape. Further, at the main forming step, a part of the die surface is provided with a recess for releasing surplus material of the workpiece in the die gap, and it is possible to use the die set composed of a plurality of segments divided at the location of the aforesaid recess.

A third step in this invention is executed such that a mandrel, having at a part thereof a cylindrical outer surface corresponding to a hollow inner surface of the rack shaft, is inserted between the aforesaid pair of leg-like sidewalls. Further, this mandrel comprises at least two separable segments in such a way that it can be pulled out of the hollow rack shaft upon completion of the third step.

Other objects and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of various embodiments of the invention, and therefore reference made to the claims which follow by the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

FIG. 1a is a front sectional view for showing a workpiece and a die.

FIG. 1b is a sectional view taken along line B—B of FIG. 1a.

FIG. 1c is a sectional view taken along line C—C of FIG. 1a.

FIGS. 7a to 7c, FIGS. 8a to 8c and FIGS. 9a to 9c are views for illustrating processes that the hollow rack shaft is formed by bending both legs of the workpiece W so as to be butted to each other.

FIG. 7a, FIG. 8a and FIG. 9a are front sectional views. FIG. 7b, FIG. 8b and FIG. 9b are sectional views taken along line B—B in each of the figures. FIG. 7c, FIG. 8c and FIG. 9c are sectional views taken along line C—C in each of the front sectional views.

FIGS. 20a to 22c illustrate the third step of this invention using a mandrel.

FIGS. 20a, 21a and 22a are front elevation sectional views.

FIGS. 20c, 21c and 22c are sectional views taken along line C—C of each of the figures.

DESCRIPTION OF THE PREFERRED EMBODIMENTS

Now, preferred embodiments of the present invention will he described in detail while referring to the accompanying drawings.

In the preferred embodiments shown in the following description, the hollow rack shaft is manufactured through a first step, a second step and a third step. That is, the original plate-like workpiece of substantial rectangular shape is bent into a gutter-like shape along a center of longitudinal direction. At this time, the central portion of the workpiece is formed into a flat bottom and its both sides are formed into a semi-circular shape having legs. At the second step, the rack teeth are formed at the central portion of the flat bottom by plastic machining. At the third step, the leg-like side walls are bent such as the edges of the walls are butted against each other, and then a hollow rack shaft is formed. In this way, this invention is not different from the prior art manufacturing method in view of the fact that the method for manufacturing the hollow rack shaft in these preferred embodiments comprises three steps, although this invention is substantially different from the prior art manufacturing method in regard to the content of each of the steps. Due to this fact, in order to avoid overlapped description about the content already described, only the different points will be described.

First Embodiment

Figure 10:
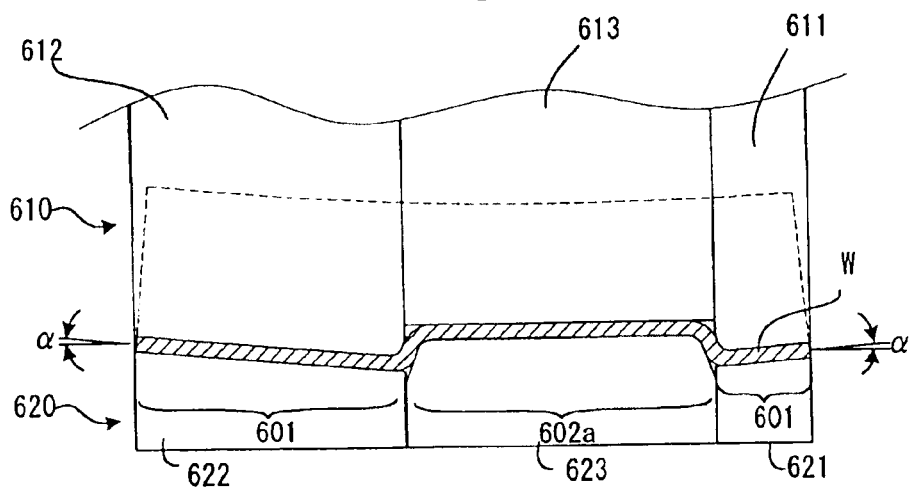
FIG. 10 is a front elevation sectional view for showing a state at the time when a flat plate workpiece is formed into a gutter-like shape at the first step of the method of this invention.

FIG. 10 is a longitudinal sectional view for showing a state at the time when a flat plate workpiece is formed into a gutter-like shape (a final end of a press stroke) at the first step of the method of this invention. In the same manner as that of the prior art, at the time to complete the first step, the plate workpiece W has a flat bottom at its central portion, and the workpiece is formed into a gutter-like shape including unformed flat portion 602a to form rack teeth at the second step and a semi-circular portion 601 having a semi-circular bottom part. Then, the die set used for this operation is also similar to that of the prior art. Namely, the die set comprises an upper die set 610 including a right upper die 611, a left upper die 612 and a central upper die 613; and a lower die set 620 including a right lower die 621, a left lower die 622 and a central lower die 623.

Figure 2:
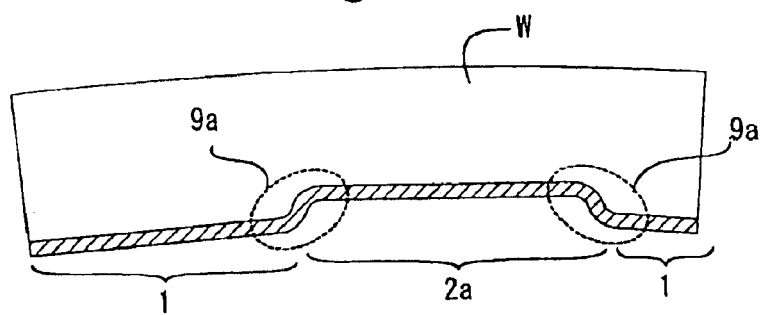
FIG. 2 is a sectional view for showing the state of the workpiece under releasing of such a stress as found in the prior art.
Figure 3:
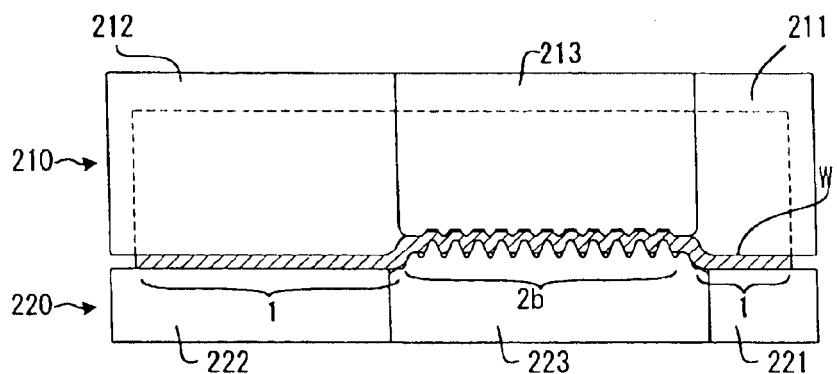
FIG. 3 is a sectional view for showing a workpiece and dies when the rack teeth are formed at the portion 2a at the second step of the prior art.
Figure 4:
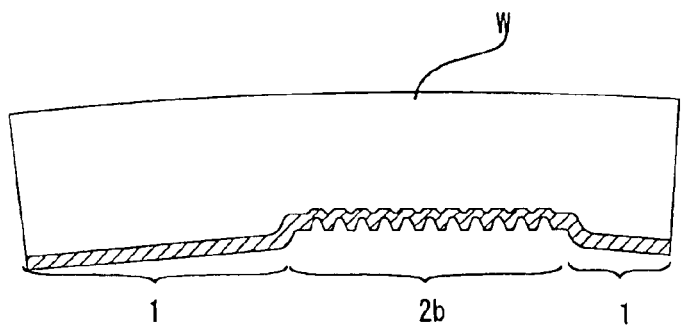
FIG. 4 is a sectional view for showing one example of the workpiece that deformation appears upon completion of the first step in the prior art.
Figure 5:
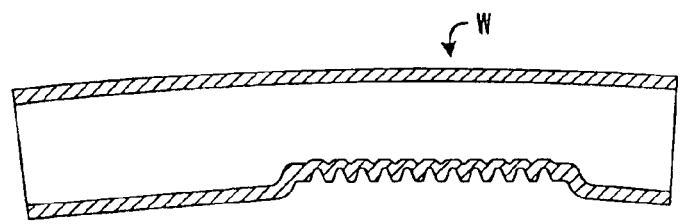
FIG. 5 is a sectional view for showing an example of the workpiece that deformation shown in FIG. 4 remains even after the third step in the prior art.
Figure 6A:
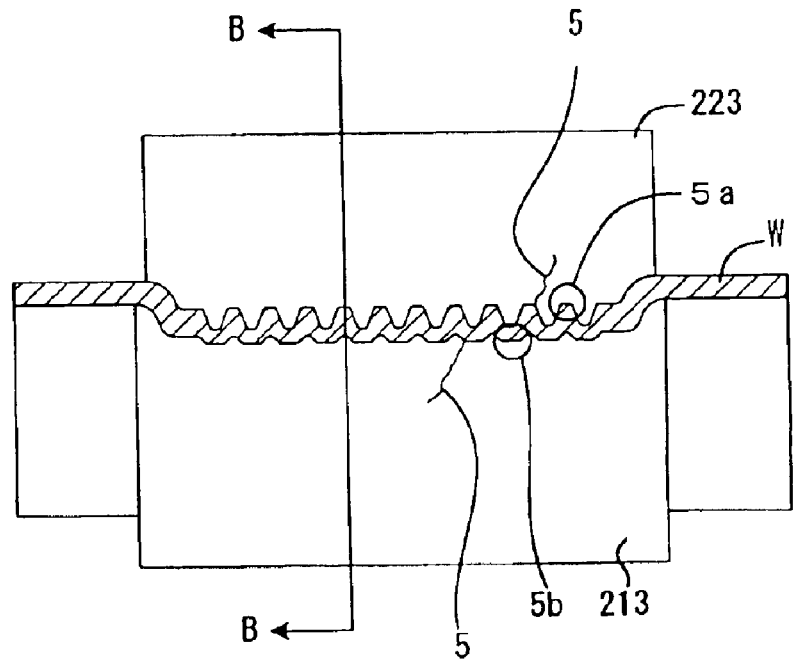
FIGS. 6a and 6b illustrate an example in the prior art that a crack is generated at the die, and they are a front sectional view and a sectional view taken along line B—B.
Figure 6B:
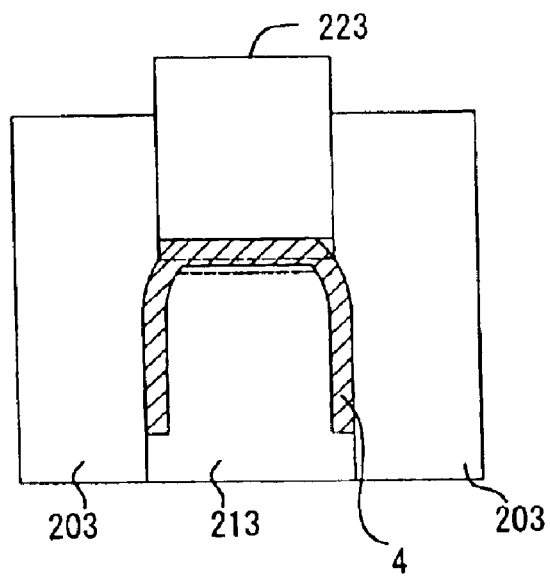
Figure 8A:
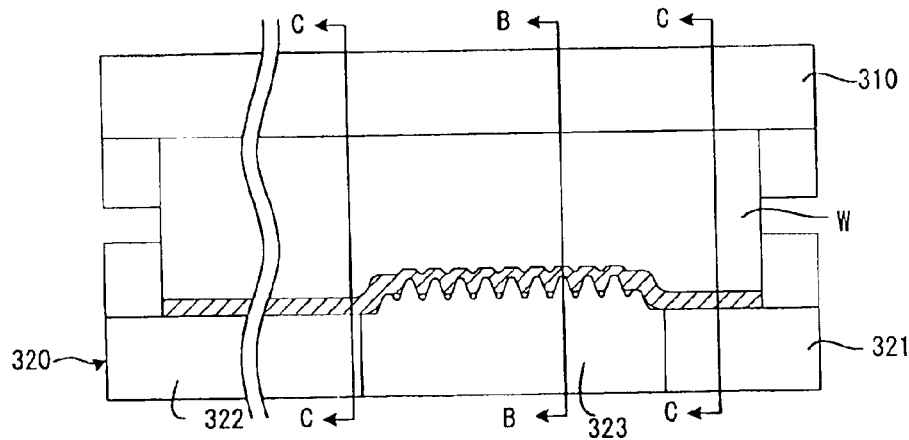
Figure 8B:
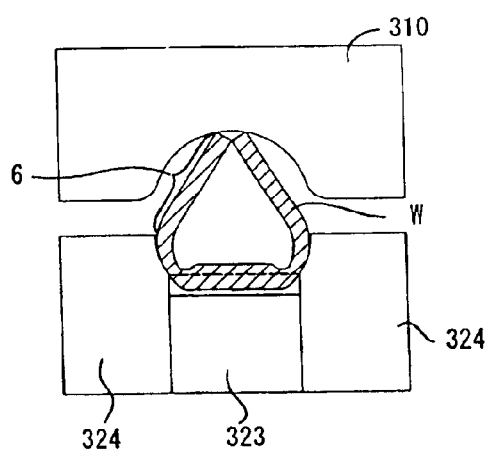
Figure 8C:
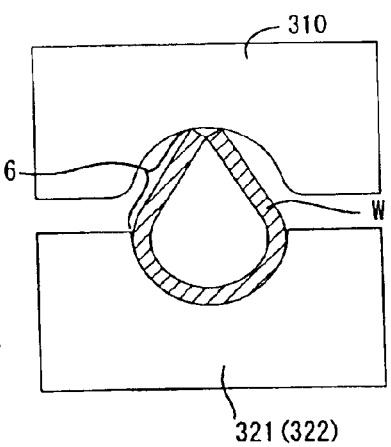
Figure 9A:
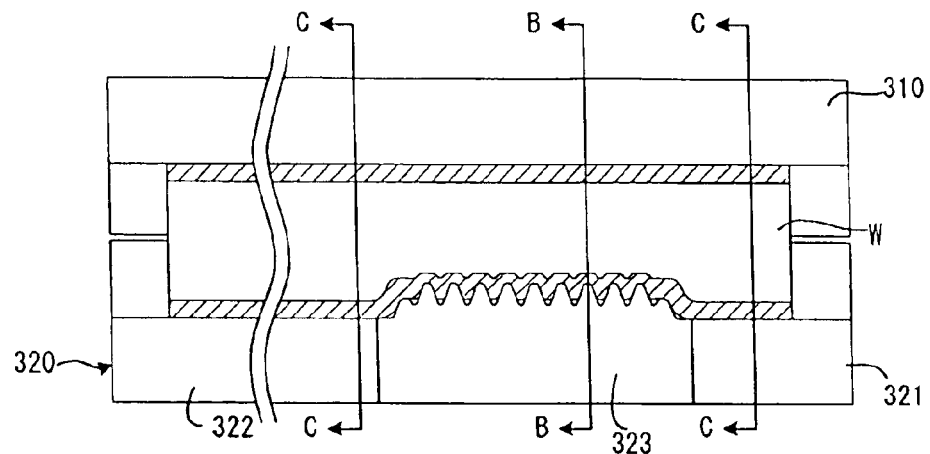
Figure 9B:
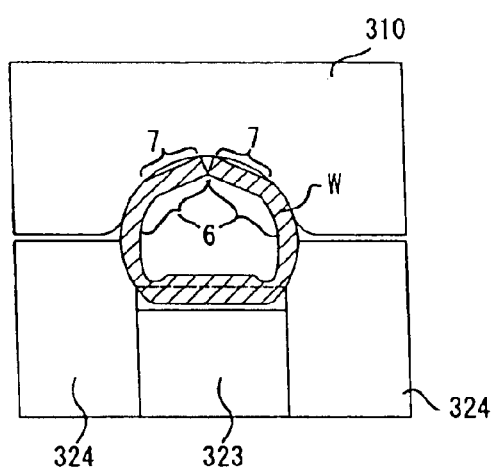
Figure 9C:
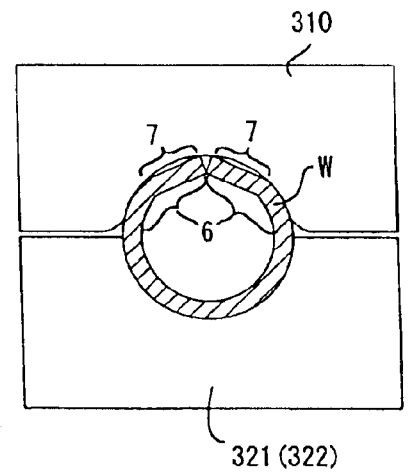
Figure 11:
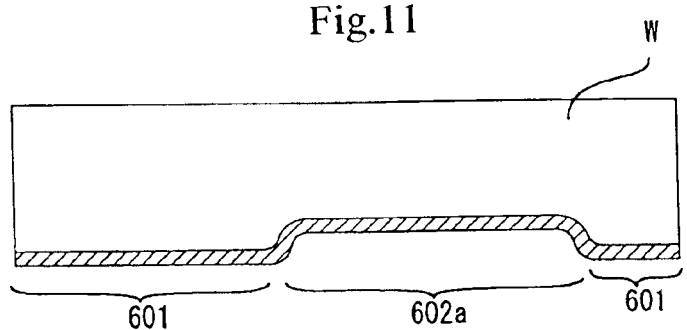
FIG. 11 is a front elevation sectional view for showing a workpiece upon completion of the first step in which a bow-like warp of the workpiece is prevented by applying an inclination angle α to the die in this invention.

However, this invention is different from the prior art in view of the fact that the die surfaces of the right upper die 611, the left upper die 612, the right lower die 621 and the left lower die 622 corresponding to the bottom of the semi-circular portion 601 are inclined by a proper inclination angle a. Applying the proper inclination angle a to these dies, the bow-like warp of the workpiece W, as shown in FIG. 2, and the inclination angle α, are canceled by each other, and the bottom portions of the two semi-circular portions 601 are arranged on one line as shown in FIG. 11 when the workpiece W is taken out from the die set. A value of the inclination angle a is adjusted according to workpiece material and the sizes (length, width and thickness) of the workpiece W, respectively, so that the most appropriate value is selected on the basis of trial-and-error.

Figure 12:
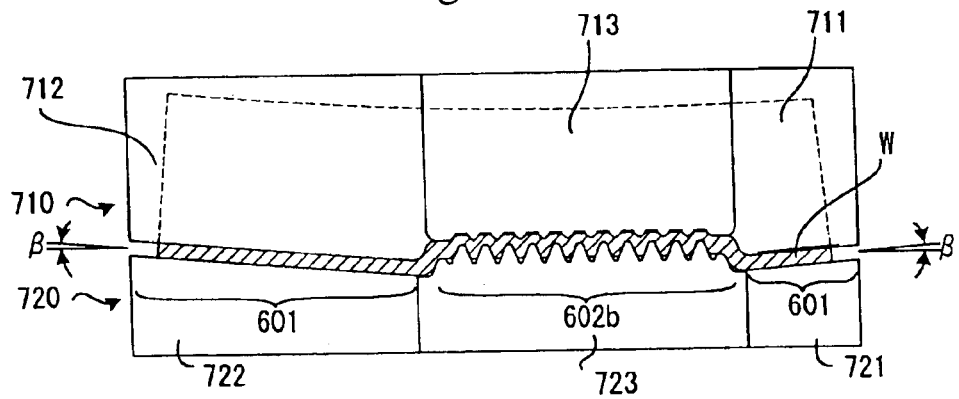
FIG. 12 is a front elevation sectional view for showing a state that a rack tooth forming at the second step in this invention is finished.

A bow-like warp at the workpiece W generated at the second step, already described, can also be canceled by the same method as above. FIG. 12 is a view for showing the case that the rack teeth are formed at the second step onto the gutter-like workpiece W formed at the first step (or the gutter-like workpiece W formed at the first step in the prior art), and it illustrates when the step has been completed. Then, the die set used at the second step comprises an upper die set 710 including a right upper die 711, a left upper die 712 and a central upper die 713; and a lower die set 720 including a right lower die 721, a left lower die 722 and a central lower die 723.

Rack teeth and corrugation are formed at the rack teeth unformed portion 602a by the central upper die 713 and the central lower die 723. As already described, in order to cancel a bow-like warp of the workpiece W generated at this time, an inclination angle β is applied to each of the die surfaces corresponding to the bottom portion of the semi-circular portion 601 of each of the right upper die 711, left upper die 712, right lower die 721 and left lower die 722, respectively. The appropriate inclination angle β is attained on the basis of a trial-and-error by similar way to the first embodiment.

Figure 13:
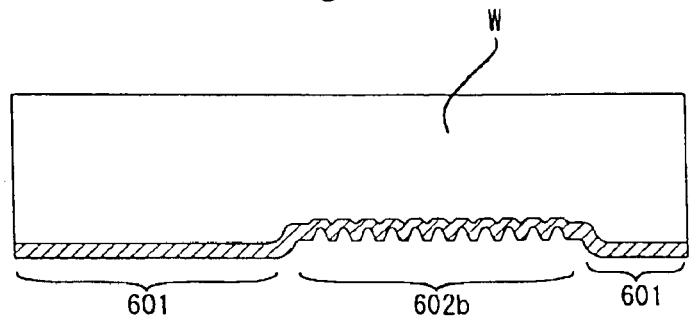
FIG. 13 is a front elevation sectional view for showing the workpiece having no warp attained at the second step of this invention.

As shown in the first embodiment, at the first step or the second step, the bow-like warp generated by the elastic recovering of the workpiece W when the workpiece W is removed from the die set can be substantially canceled, as shown in FIG. 13, by applying either the inclination angle α or β to the die set. Due to this fact, any particular working step for correcting the bow-like warp is eliminated and the hollow rack shaft can be manufactured at a low cost.

Second Embodiment

Figure 1A:
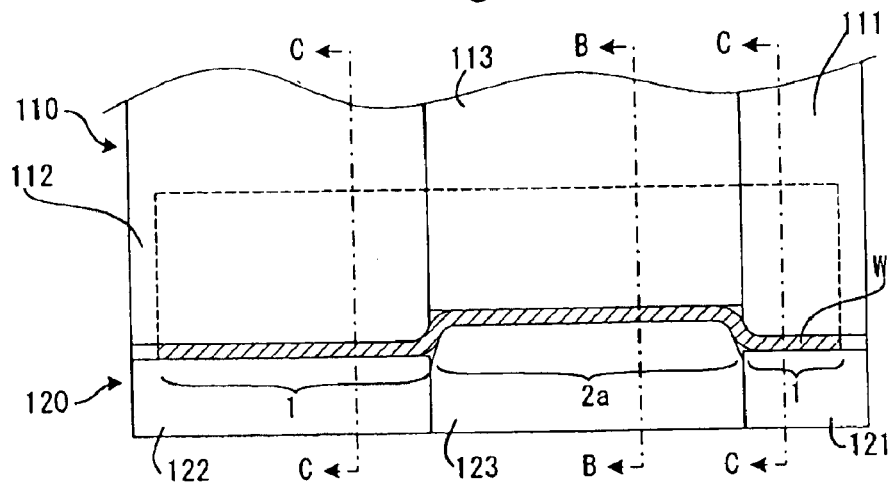
FIGS. 1a to 1c show the state when the flat plate workpiece is formed into a gutter-like shape at the first step of the prior art manufacturing method.
Figure 1B:
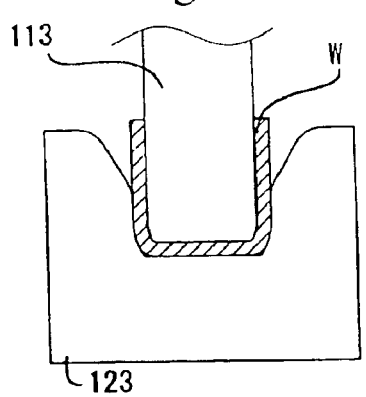
Figure 1C:
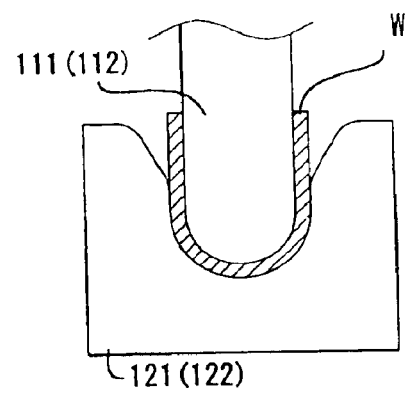
Figure 14:
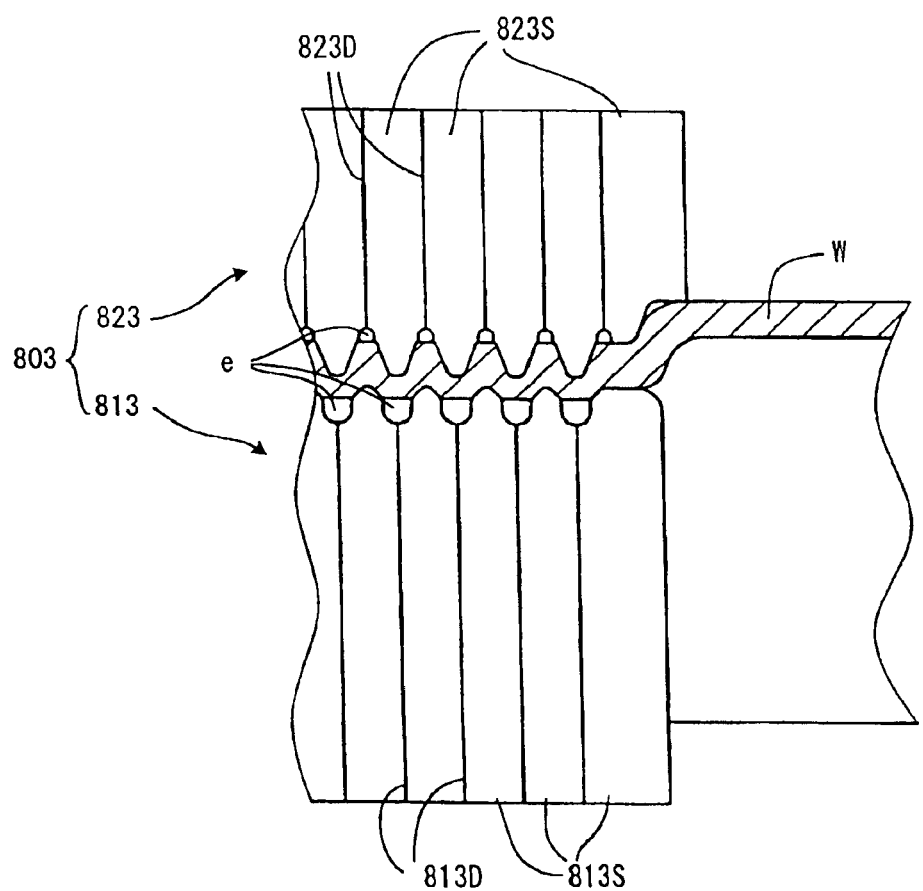
FIG. 14 is a front elevation sectional view for showing the die set used in the second step of this invention and the workpiece W formed by this die set.

At the second step of the second preferred embodiment, the die surface is provided with a recess for releasing an excessive increase in pressure in the die clearance at the stroke end of the pressworking. FIG. 14 is a longitudinal section for showing a die set 803 including a central upper die 813 and a central lower die 823 used in the second step, and the workpiece W formed by this die set. It should be noted that FIG. 14 to FIG. 19 are different from FIG. 1 in view of the fact that the upper or lower side of the workpiece W is in reverse state.

Each of the central upper die 813 and the central lower die 823 is a split type die composed of a plurality of segments 813S, 823S. Symbols 813D, 823D denote their dividing lines. The extremity end of the segment 823S has a shape corresponding to one surface of rack teeth and forms one rack tooth with the same shape of another adjoining segment 823S. Similarly, the extremity end of the segment 813S is provided with a shape corresponding to the inside of the rack teeth and forms a shape similar to one tooth shape with the same shape of another adjoining segment 813S. Each of the central upper die 813 and the central lower die 823 is provided with a recess e, wherein this recess e is arranged to pass through the dividing lines 813D, 823D. Accordingly, each recess e is positioned at the rack tooth or at the tooth bottom part of shape similar to the tooth shape.

Figure 15:
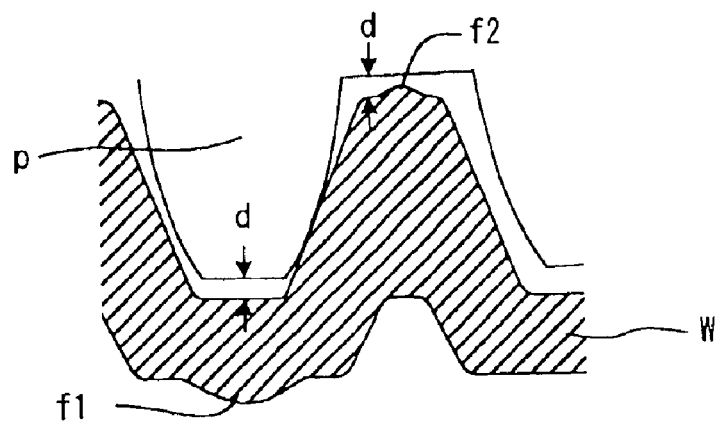
FIG. 15 is an enlarged sectional view for showing the workpiece which was formed protrusions f1 and f2 corresponding to a recess e.

When the rack teeth are formed by the central upper die 813 and the central lower die 823 having such recess e as above, if the material of the workpiece W within the die clearance at the stroke end of the pressworking is excessive, the material flows into the recess e, as a result, it is possible to prevent the pressure within the die clearance from being excessively increased. Thereby it is possible to prevent the die from being damaged or cracked. Then, at this time, protrusions f1, f2 indicated in FIG. 15 are formed at the location corresponding to the recess e of the workpiece.

Since the protrusion f2 formed at the rack teeth side is formed at the location opposing against the tooth bottom of a pinion when rack teeth are engaged with the pinion p, a sufficient large clearance d is established there in view of design. Therefore, there is no possibility that the protrusion f2 becomes the hindrance which comes in contact with the pinion p in gear transmission. Since the protrusion f1 is placed at an opposite side of the rack teeth, it does not become a hindrance in gear transmission.

Figure 16:
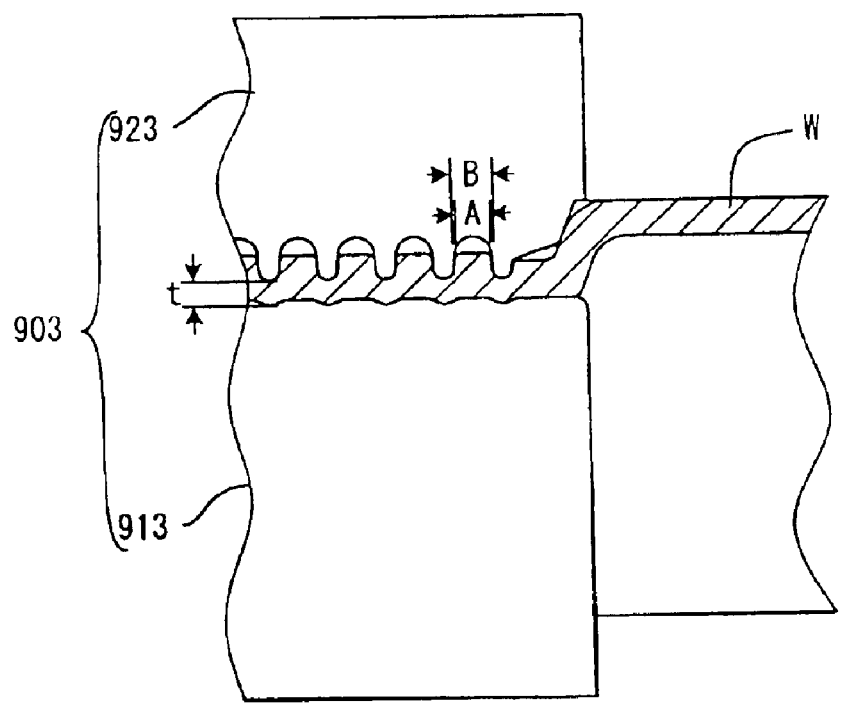
FIGS. 16 to 18 are front elevation sectional views for showing the die set and the workpiece in this invention to illustrate a state in which a second step is divided into a preliminary forming step and a main forming step.
Figure 17:
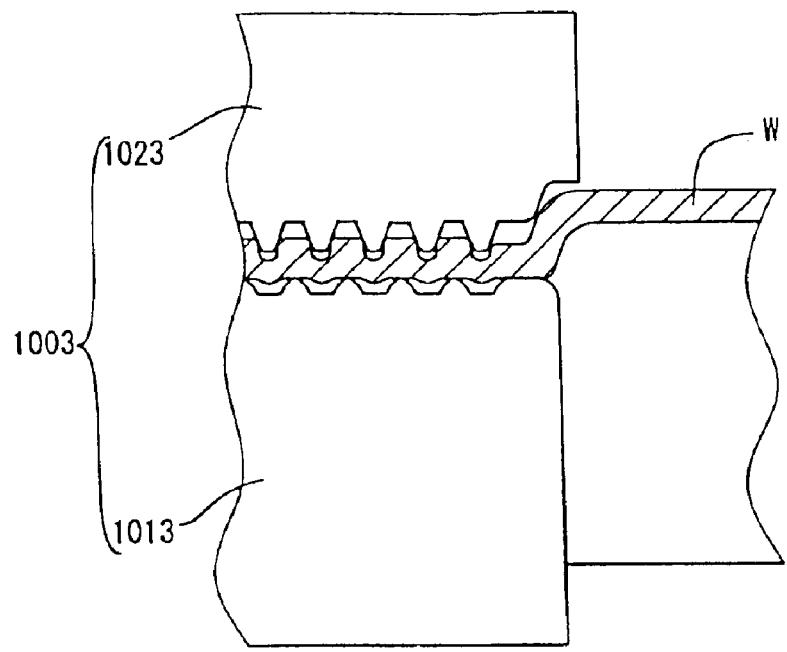
Figure 18:
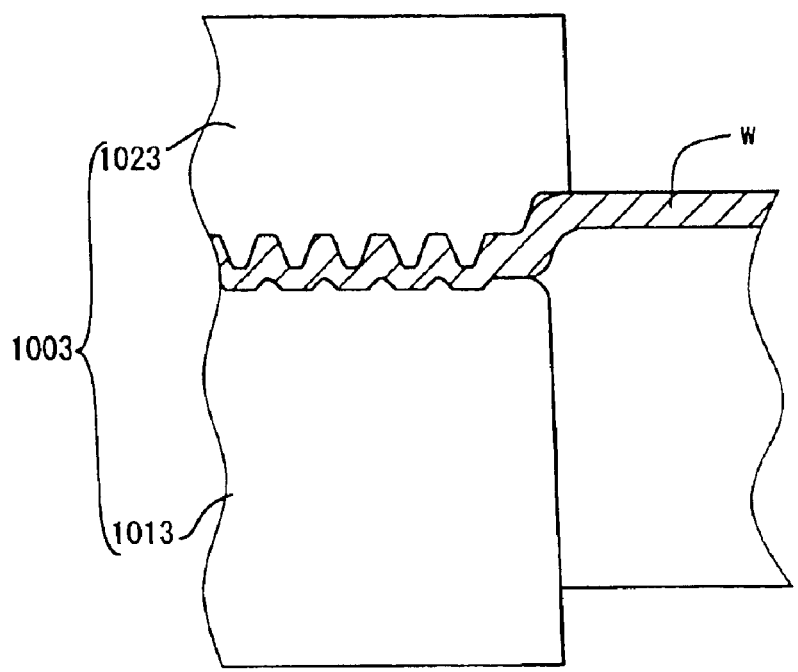

The second step is divided into two steps, i.e. a preliminary forming step and a main forming step to prevent the die from being damaged. FIGS. 16 and 18 are longitudinal sections for showing the die set and the workpiece W when the preliminary forming step and main forming step have been completed. In addition, FIG. 17 is a longitudinal section between the die set and the workpiece W indicating the initial state of the main forming step.

The preliminary forming process is carried out by the die set 903 including the central lower die 923 and the central upper die 913. At the preliminary forming, an intermediate shape to reach to the final shape is formed. The teeth formed by the central lower die 923 in the preliminary forming process are not narrowed at the upper end as the final rack tooth shape. Describing in more detail, the tooth thickness A at the tooth end is slightly thinner than the tooth thickness B at the tooth root. The best shape is that the tooth has the taper that the tooth end thickness A is thinner than the root B, in order to remove the workpiece W easily from the central lower die 923 after the preliminary step has been completed. The pressure angle is smaller than the final tooth shape.

The tooth thickness A and the tooth thickness B are designed thinner than a tooth size of rack teeth of the product. It is desirable that the plate thickness t at the tooth root portion is established as same as that of the tooth root of the product. The phase and pitch are established as same as those of the rack teeth of the product. The tooth shape formed in the preliminary forming step is optional except their pitch and phase.

This preliminary forming process is a simple forming process, so that the material easily flows, a load to the die set 903 can be remarkably reduced as compared with that of forming the rack teeth in one step.

As shown in FIGS. 17 and 18, in the main forming process, a die set 1003 for the main forming process composed of a central lower die 1023 having a complementary shape to the shape of the product rack. Since the workpiece is already formed to an approximately near shape to the final product by the preliminary forming step, the requisite material flow is less in its volume and the load applied to the die can be substantially reduced.

Figure 19:
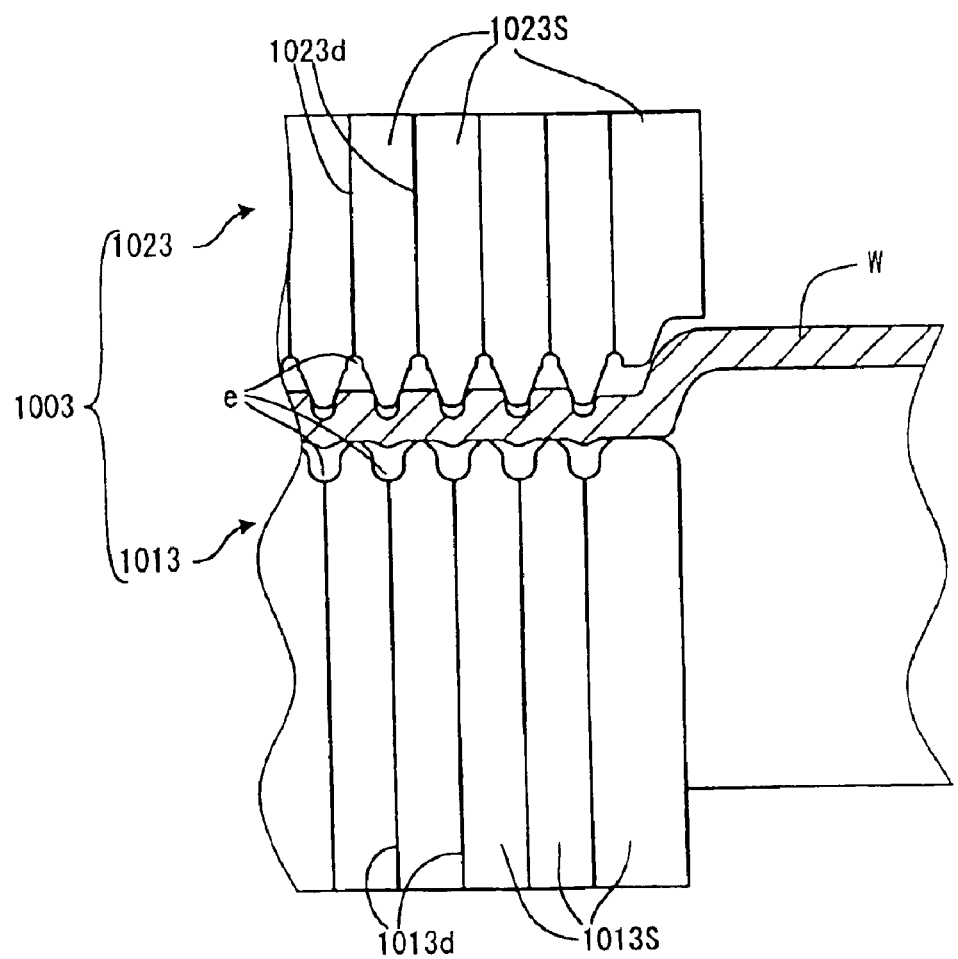
FIG. 19 is a front elevation sectional view for showing an example in this invention that the central lower die for the major forming at the second step is divided.

The dies 913, 923, 1013 and 1023 shown in FIGS. 16 to 18 can be divided into segments. FIG. 19 shows an example in which the die set 1003 for the main forming process is composed of the central lower die 1023 and the central upper die 1013; each of dies 1023 and 1013 comprises a plurality of segments 1023S and a plurality of segments 1013S, respectively.

In the second embodiment, a die load can be reduced by flowing the excessive material into the recess e. The die load is also reduced by dividing die into a plurality of segments at the location of the recess, and further dividing the second step into two steps.

Third Embodiment

Figure 20A:
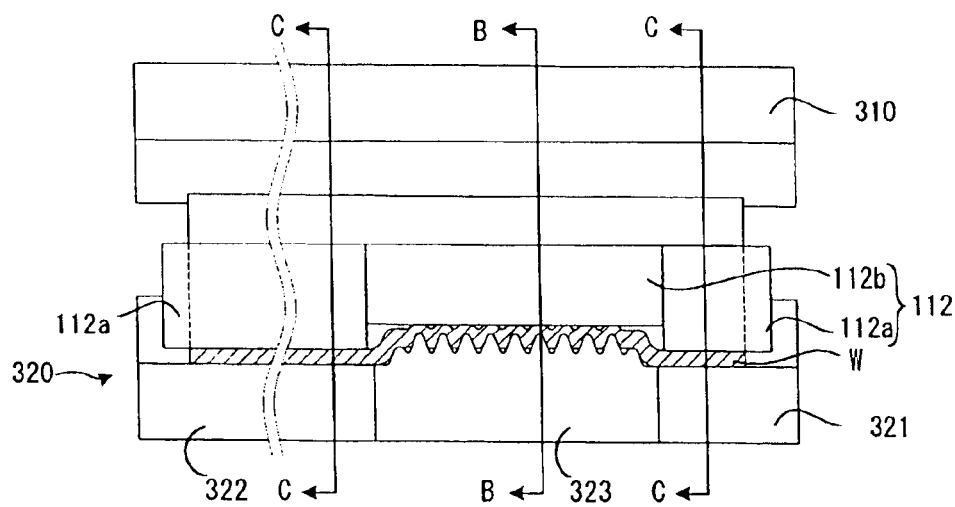
Figure 20B:
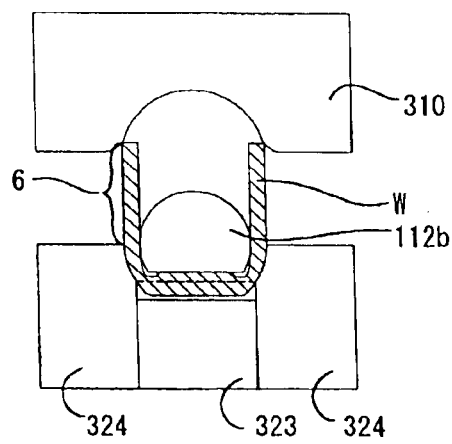
FIGS. 20b, 21b and 22b are sectional views taken along line B—B of each of the figures.
Figure 20C:
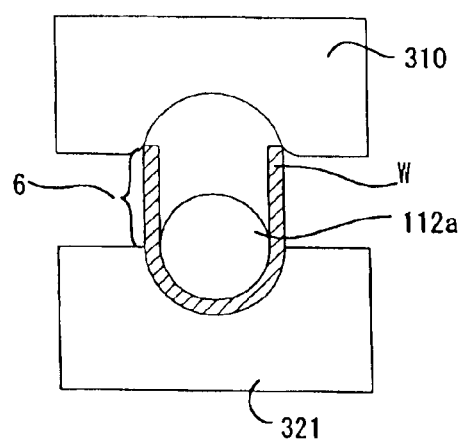
Figure 21A:
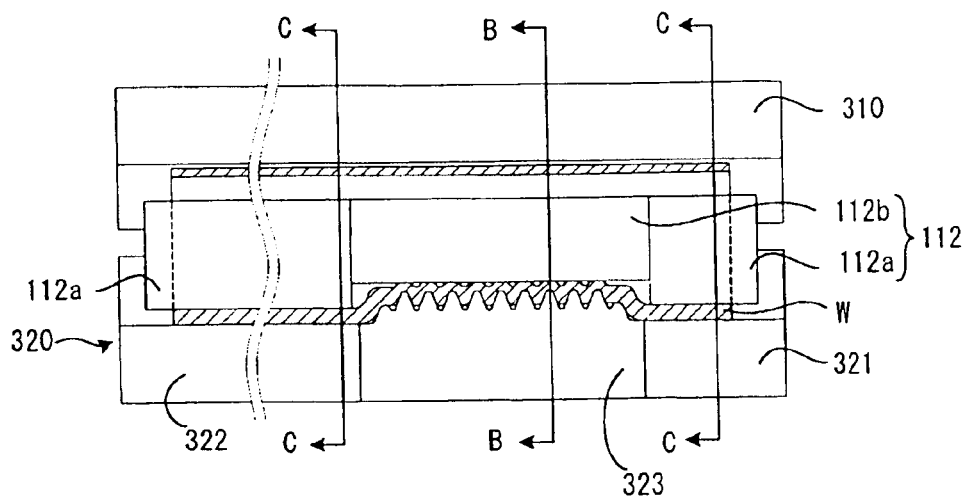
Figure 21B:
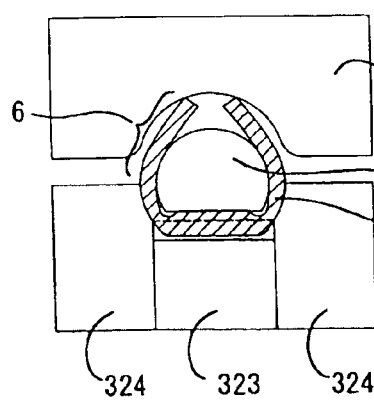
Figure 21C:
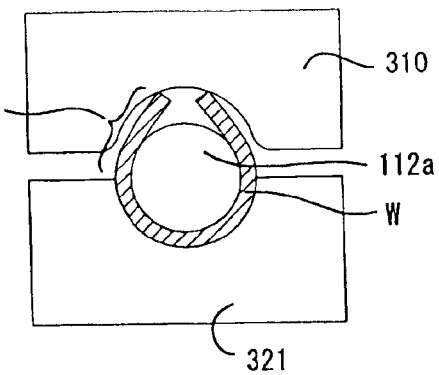
Figure 22A:
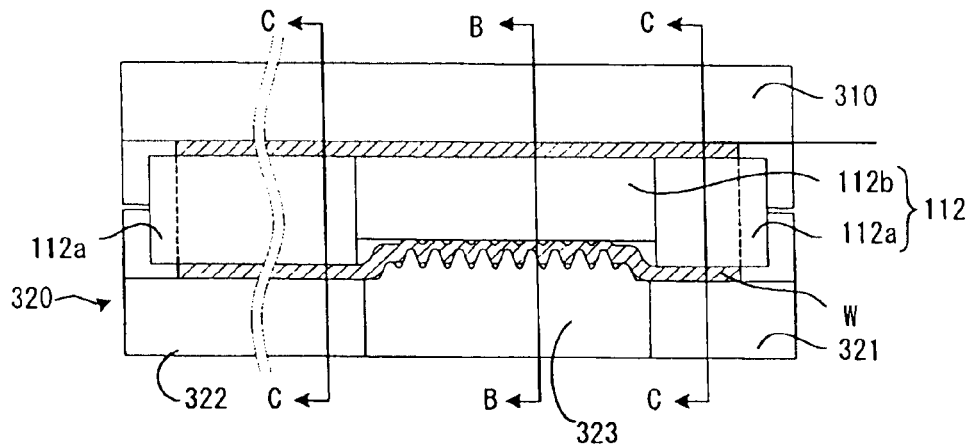
Figure 22B:
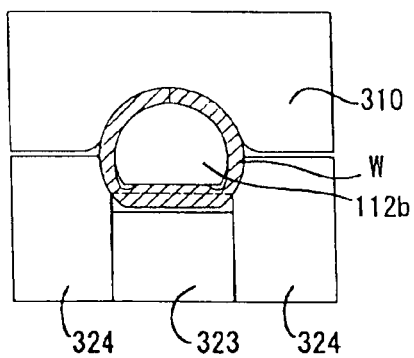
Figure 22C:
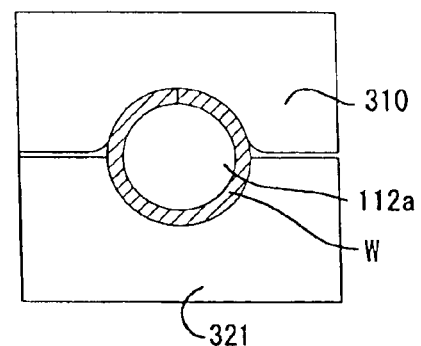
Figure 23:
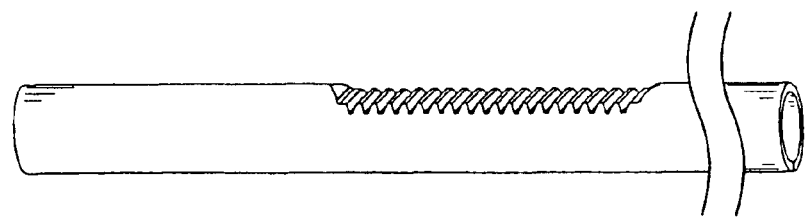
FIG. 23 is an outer appearance view for showing the completed hollow rack shaft in this invention.

The aforesaid problem of the third step in the prior art, that is, the back surface of the rack shaft cannot be formed into a true circle is resolved by using the mandrel as shown in FIGS. 20a to 22c. FIGS. 20a, 21a and 22a are front elevation sectional views; FIGS. 20b, 21b and 22b are sectional views taken along line B—B in each of the front elevation sectional views; and FIGS. 20c, 21c and 22c are sectional views taken along line C—C in each of the front elevation sectional views. The same reference symbols in FIGS. 7a to 9c are used except for the symbol 112 of the mandrel are used in these figures.

The workpiece W formed with rack teeth upon completion of the second step is placed on the lower die set 320. At this time, as shown in FIGS. 20a to 20c, the workpiece W is placed such that two legs 6 are faced up. The upper surface of the central lower die 323 is complementary to the rack tooth shape, and each of the rack teeth is fitted to this complementary rack tooth surface. The upper surface of each of the right lower die 321 and the left lower die 322 has a circular shape as the lower surface of the workpiece W is well fitted.

A mandrel set 112 is inserted between the two legs 6. The mandrel set 112 comprises two members or segments to intend such that each member can be pulled out after they are butted to each other. One of them comprises a central D-shaped portion 112b and a circular portion 112a extending from the former, and the other comprises only a circular portion. Since any composition is acceptable if the mandrel set 112 can be pulled out after operation, it is also possible that it is divided into three members of two circular portions and one D-shaped portion, or it can be divided into two symmetrical segments at the central part of the D-shaped portion.

Then, as the upper die 310 descends, both legs 6 of the workpiece W are guided at the semi-circular concave surface, receive a bending force directed inwardly, start its deformation. At this time, a high bending moment is applied to a location near the roots of the legs 6 at the beginning and a small bending moment is merely applied to the location near the extremity ends of the legs 6. However, since the mandrel set 112 exists, the part where the largest bending moment is applied moves along the cylindrical outer surface gradually from the roots of the legs 6 toward the extremity end portions of the legs 6. The middle of the state is shown in FIGS. 21a to 21c and the final state is shown in FIGS. 22a to 22c. In this way, the back surface of the rack shaft is formed into a circular shape.

After this operation, when the upper die 310 ascends, a slight clearance is formed between the mandrel set 112 and the workpiece W by an unavoidable spring-back of the workpiece W, resulting in that the mandrel set 112 can be easily pulled out. After this operation, since the slight opened butted portions can be closed by a quite low force, they are welded under the closed state by laser welding, for example. Even if this rack shaft is finished and ground, a mere slight grinding margin is required and the strength of the rack shaft is not substantially reduced by grinding operation.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method for manufacturing a hollow rack shaft comprising:
   a first step for forming a substantially flat and rectangular plate workpiece into a gutter-like shaped workpiece, said gutter-like shaped workpiece having a flat bottom portion, a pair of semi-circular bottom portions extending from each longitudinal side of said flat bottom portion and a pair of leg-like side walls extending upwardly in parallel from each lateral side of said flat bottom portion and said semi-circular portions;

a second step for forming a row of rack teeth on said flat bottom portion of said gutter-shaped workpiece; and a third step for forming said workpiece into a hollow shape by bending said leg-like side walls by butting edges of said walls against each other;

wherein said second step further comprises a preliminary forming step and a main forming step;

wherein, at said preliminary forming step, a row of intermediate rack teeth substantially equal to a finally required pitch and smaller than a finally required pressure angle is formed;

wherein, at said main forming step, a row of rack teeth with required tooth shape is formed; and wherein, a surface of the die set used in said main forming step is provided with a plurality of recesses for releasing surplus material of said workpiece in a die clearance at a stroke end; and wherein, each die of said die set is divided into a plurality of segments at said recess.

* * * * *